June 18, 1957  E. J. METSKER  2,795,890

HOOK HOLDING HATBAND

Filed Oct. 22, 1954

EARL J. METSKER
INVENTOR.

BY
McMorrow, Berman & Davidson
ATTORNEYS

United States Patent Office 2,795,890
Patented June 18, 1957

2,795,890

HOOK HOLDING HATBAND

Earl J. Metsker, Hood River, Oreg.

Application October 22, 1954, Serial No. 463,930

2 Claims. (Cl. 43—57.5)

This invention relates to an improved fishing hook holding device which is especially but not exclusively designed to be worn on a hat and can be in the form of a belt or incorporated in a garment or the like.

The primary object of the invention is to provide a more practical and efficient device of the character indicated above which holds fishing hooks and artificial flies resiliently but securely and with which the hooks and flies can be easily and quickly engaged and removed.

Another important object of the invention is the provision of a device of the character indicated above, which is simple in construction, involves advantageous and novel use of modern materials, and can be made in serviceable and attractive forms at relatively low cost.

Other important object and advantages of the invention will be apparent from the following description and the accompanying drawing, wherein, for purposes of illustration only, a specific embodiment of the invention is set forth in detail.

Figure 1:
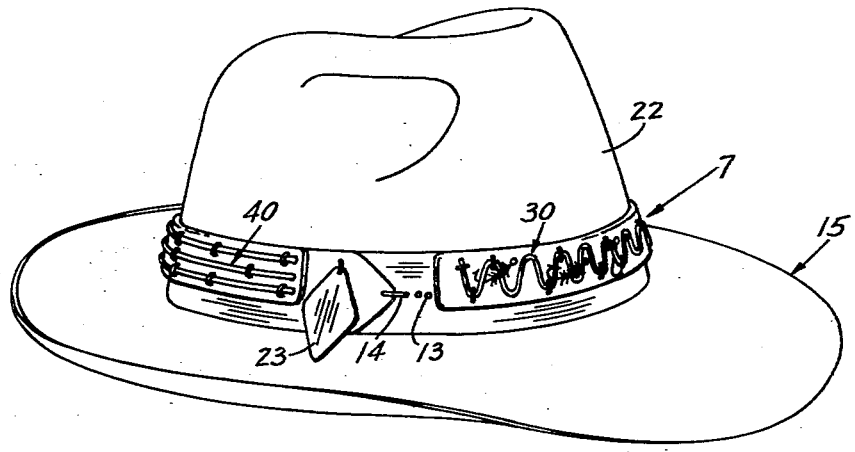
Figure 1 is a perspective view showing the device applied to a hat.
Figure 2:
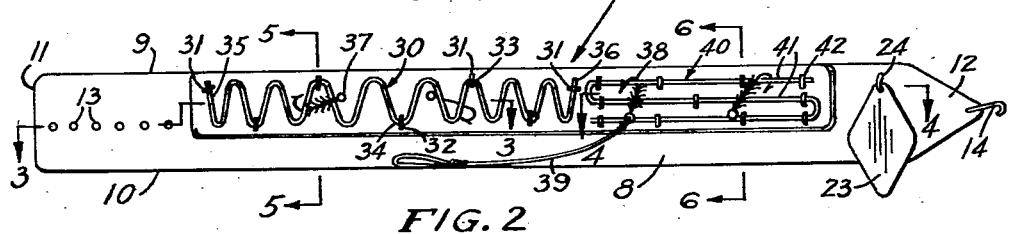
Figure 2 is an outer side elevation.
Figure 3:
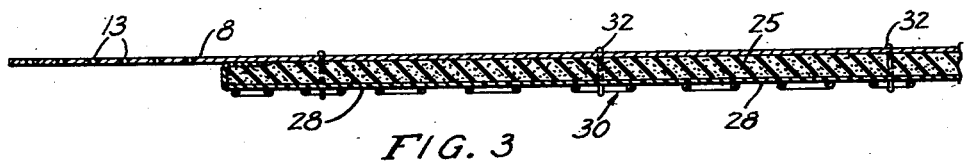
Figure 3 is an enlarged fragmentary longitudinal section taken on the line 3—3 of Figure 2.
Figure 4:
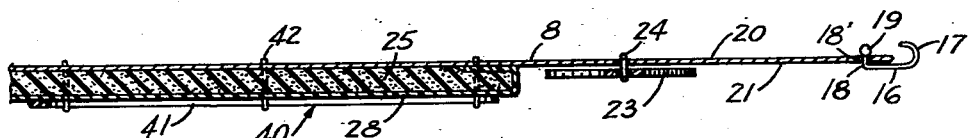
Figures 5, 6:
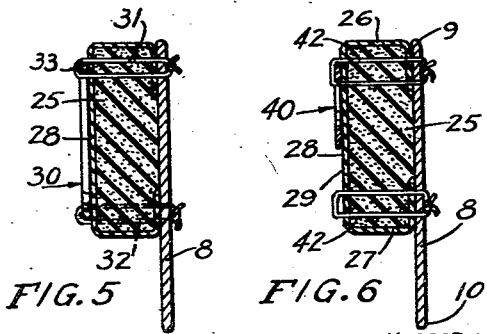

Figure 4 is an enlarged fragmentary longitudinal section taken on the line 4—4 of Figure 2; and Figure 5 and Figure 6 are enlarged transverse vertical sections taken on the lines 5—5 and 6—6 of Figure 2.

Referring in detail to the drawings, wherein like numerals designate like parts throughout the several views, the illustrated device, generally designated 7, comprises an elongated strip or band 8 of flexible material, such as fabric, leather or the like having parallel side edges 9 and 10, a squared end 11, and tapered end 12.

Near the end 11 the strap 8 is provided with a longitudinal row of spaced holes 13 with which a fastener 14 is selectively engageable when the device is in use as a belt or as a hatband on a hat 15. The fastener 14 has a shank 16 having a crook 17 on one end which is adapted to engage through a selected one of the holes 13, and a lateral arm 18 on its other end. The arm 18 extends through a hole 18' the tapered end 12 of the strap 8 and has a retaining head 19 thereon.

The strap 8 has an inner side 20 and an outer side 21, the inner side 20 being for body contact or to engage the crown 22 of a hat 15. A fishing hook point sharpening plate 23, preferably in diamond form is suspended freely at the outer side 21 of the strap 8 near the tapered end 12 by a preferably metal eye 24 engaged through the strap 8.

Extending along the outer side 21 of the strap 8 is an elongated pad or block 25 of sponge rubber or other resilient and compressible sponge material, and of rectangular cross section. The pad 25 has an upper edge 26 preferably flush with the upper edge 9 of the strap 8 and a lower edge 27 spaced parallel from the lower edge 10 of the strap 8.

The pad 25 terminates at its opposite ends in longitudinally spaced relation to the ends of the strap 8. The exposed side and the ends of the pad 25 are covered by a flexible and resilient sheet material covering 28 of such as rubber, to protect the pad 25 from being snagged or penetrated by hooks or artificial flies and to protect it from injury and wear.

The edges of the covering 28 are turned around against the inner side of the pad 25 and the main part 29 of the covering and the edges thereof are secured to the pad 25 by suitable means, such as cement. The pad 25 is secured to the strap 8 by suitable means such as cement.

Occupying a major portion of the exposed surface of the pad 25 is a zig-zag fish hook retainer 30 which extends in serpentine form along the pad from the end thereof adjacent to the strap end 11 to a point slightly more than half-way to the strap end 12. The retainer 30 is preferably in the form of a single length of resilient spring wire, and is held in place by upper and lower securing elements 31 and 32, respectively, which traverse the pad 25, the cover 28, and the strap 8, and may be in the form of cord loops, tied at the inner side 20 of the strap 8. The securing elements are vertically staggered along the pad 25 and engage around upper and lower apices 33 and 34, respectively, formed by the V-shaped components of the retainer 30. The terminal components 35 and 36 of the retainer are secured by upper securing elements 31.

Alternate ones of the apices of the retainer 30 are free of securing elements. Fish hooks 37 are adapted to be lodged behind the V-shaped components by pushing them therebetween with the barbed portions behind the retainer 30. The resiliency and compressibility of the pad 25 coupled with the resiliency of the retainer 30 securely holds the hooks in place, yet provides for their easy deliberate removal.

For holding artificial flies 38 involving leaders 39 a fly retainer 40 is provided on the exposed side of the pad 25 between the fish hook retainer 30 and the sharpening device 23. The retainer 40 comprises, preferably, a single piece of flat spring strip bent to provide three parallel spaced straight portions 41 extending lengthwise along the pad 25 and secured at intervals along their lengths by cord loops 42 traversing the cover 28, the pad 25, and the strap 8 and tied behind the strap 8.

The various securing loops 31, 32 and 42 traverse also the turned in edges of the covering 28 whereby the assembly is reinforced.

Artificial flies 38 are adapted to be engaged vertically between the longitudinal portions 41 of the retainer 40 and the pad 25, with the leaderss 39 depending therefrom.

The retainer 40 has preferably a protector covering of plastic or the like.

What is claimed is:

1. A fish hook holding hatband comprising a flexible band adapted to have its inner surface contact and extend about the crown of a hat, a block of resilient material having its inner surface contacting and secured upon the outer side of said band and extending longitudinally of the band, a length of resilient wire of serpentine form providing alternate apices along opposite longitudinal edges secured upon the outer surface of said block to define a retainer for fish hooks and extending longitudinally of said block from adjacent one end thereof to an intermediate location thereon with the apices along opposite sides of said retainer arranged adjacent opposite side edges of said block and adapted to releasably receive and retain fish hooks between the apices of said retainer and said block, and means securing opposite ends of some of the apices of said retainer to said block to hold the retainer in place on the block.

2. A fish hook holding hatband comprising a flexible band adapted to have its inner surface contact and extend about the crown of a hat, a block of resilient material having its inner surface contacting and secured upon the outer side of said band and extending longitudinally of the band, a length of resilient wire of serpentine form providing alternate apices along opposite longitudinal edges secured upon the outer surface of said block to define a retainer for fish hooks and extending longitudinally of said block from adjacent one end thereof to an intermediate location thereon with the apices along opposite sides of said retainer arranged adjacent opposite side edges of said block and adapted to releasably receive and retain fish hooks between the apices of said retainer and said block, and means securing opposite ends of some of the apices of said retainer to said block to hold the retainer in place on the block, and a single piece of spring strip material secured to said block and formed to provide spaced parallel straight portions extending longitudinally of said block between the opposite side edges thereof from adjacent said intermediate location on said block to adjacent the other end thereof to define a fishing fly retainer for releasably holding fishing flies between said straight portions and said resilient block.

References Cited in the file of this patent

UNITED STATES PATENTS

| | | |
|---|---|---|
| 1,787,568 | Cooke | Jan. 6, 1931 |
| 2,065,234 | Martinez | Dec. 22, 1936 |
| 2,481,586 | Gregory | Sept. 13, 1949 |
| 2,497,188 | Schindler | Feb. 14, 1950 |
| 2,597,601 | Sherman | May 20, 1952 |